Dec. 18, 1934.    J. K. DIAMOND    1,984,634
DEVICE FOR APPLYING BELT FASTENERS AND THE LIKE
Filed Sept. 18, 1933
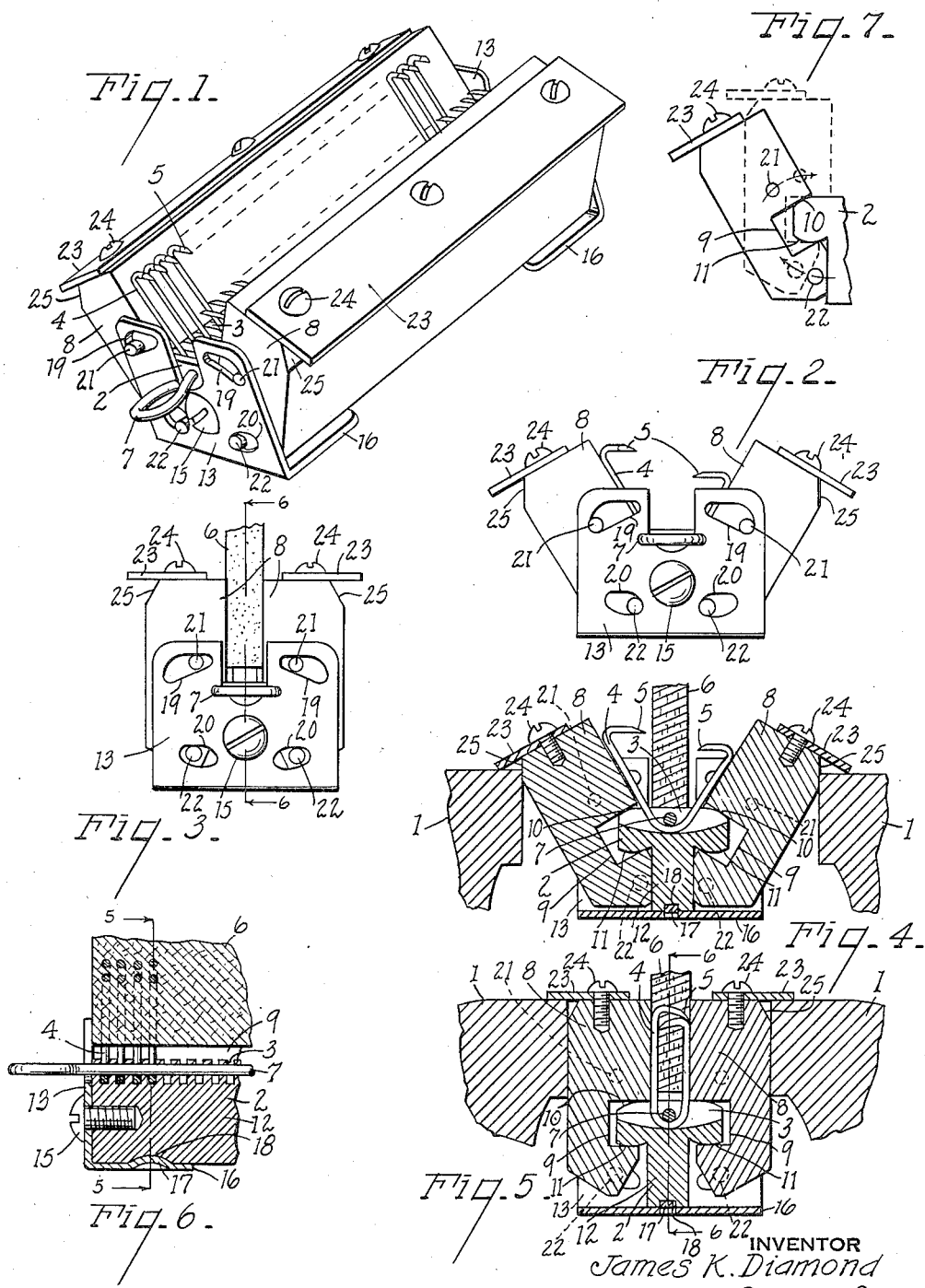
INVENTOR
James K. Diamond
BY
Chappell & Earl
ATTORNEYS Patented Dec. 18, 1934

1,984,634

UNITED STATES PATENT OFFICE 1,984,634

DEVICE FOR APPLYING BELT FASTENERS AND THE LIKE

James K. Diamond, Grand Rapids, Mich., assignor to Clipper Belt Lacer Company, Grand Rapids, Mich.

Application September 18, 1933, Serial No. 689,863

5 Claims. (Cl. 1—49.4)

The main objects of this invention are:

First, to provide a device for applying belt fasteners to belts which results in the setting of the fasteners so that there is little tendency for the same to open.

Second, to provide an improved belt fastener adapted to be used in a vise which is highly efficient and at the same time very easy to manipulate.

Third, to provide an improved belt fastener in which the closing movement of the jaws is so controlled as to most effectively set the fasteners.

Fourth, to provide an improved belt fastener applying device which is very simple and economical in structure and at the same time strong and durable.

Objects pertaining to details and economies of my invention will definitely appear from the description to follow. The invention is defined in the claims.

A structure which embodies the features of my invention is clearly illustrated in the accompanying drawing, in which:

Fig. 1 is a perspective view of a belt fastener device embodying the features of my invention, a partial load of belt lacing hooks or fasteners being shown therein to illustrate the relation of the hooks to the operating parts.

Fig. 2 is an end elevation.

Fig. 3 is an end elevation with the jaws closed, a fragment of the belt being shown in operative relation.

Fig. 4 is a fragmentary transverse section showing the device mounted in a vise, the parts being shown in initial position.

Fig. 5 is a fragmentary section on a line corresponding to line 5—5 of Fig. 6 with the jaws closed.

Fig. 6 is a fragmentary longitudinal section on a line corresponding to line 6—6 of Figs. 3 and 5.

Fig. 7 is a fragmentary end view with the end plate or support removed, the jaw being shown in open position by full lines and in closed position by dotted lines, the movement of the jaw in closing being indicated by the arrows.

In the accompanying drawing 1, 1 represent the jaws of a vise. In the embodiment of my invention illustrated the fastener holder 2 is provided with a series of transverse slots 3 uniformly spaced and adapted to receive the bight portions of the belt lacing hooks or fasteners 4. These hooks or fasteners are of general U shape, one arm being longer than the other, and they terminate in inwardly turned prongs 5. This type of belt lacer or fastener is very extensively used in the industry.

6 represents a fragment of belt and in Fig. 5 I illustrate the fasteners in set position with their prongs embedded within the belt. The belt fasteners are retained within the holder by means of the locking pin 7 which is arranged through a longitudinal bore in the holder spaced from the bottom of the slots so that the locking pin engages within the bights of the fasteners as shown in Fig. 6.

The opposed coacting jaws 8 are provided with longitudinal recesses 9 receiving the opposite sides of the holder which has a curved bearing portion 10 on its upper sides and curved bearing portions 11 on its lower side. These bearing portions coact with the tops and bottoms of the recesses 9 and support the jaws to avoid swinging or rocking movement.

The holder is preferably of T cross section as shown in the drawing, the web portion 12 constituting a support to which the end plates or supports 13 are secured by means of the screws 15. These supports 13 are angled and their horizontal arms 16 underlying the holder have lugs 17 struck up therefrom engaging recesses 18 in the bottom of the web 12. Thus arranged the single screw 15 is sufficient to effectively support these plates 14.

To further support and to control the movement of the jaws in closing the end plates are provided with vertically spaced cammed slots 19 and 20 which are engaged by pins 21 and 22, respectively, on the ends of the jaws. The jaws are provided with plate-like rests 23 secured to the upper sides of the jaws by the screws 24 and adapted to rest upon the jaws 1 of a vise as shown in Fig. 4, supporting the device in position for positioning the belt and for the closing of the vise. The jaws are preferably beveled or cut away at their upper outer corners as at 25, thus facilitating the positioning of the device in the vise.

It will be noted that when the jaws are open as shown in Figs. 1 and 2 the pins 21 are at the inner ends of the slots 19 and the pins 22 are at the outer ends of the slots 20. It is also to be noted that the upper edges of the slots 20 have a substantially horizontal portion at their inner ends. As the jaws are closed the pins 22 swing outwardly while the pins 21 swing inwardly, these pins being on opposite sides of the rocking bearing support of the jaws on the holder, and during the final closing movement of the jaws the pins 22 traveling on these substantially horizontal portions of the cam slots cause the jaws to swing to and close with their faces in a substantially parallel relation. This movement is effective in setting the prongs and also in bending and applying pressure to the belt lacing hooks so that there is little tendency for the hooks to open owing to the resilience of the wire from which they are formed.

My improved belt lacing device is very simple and economical in structure and is especially designed by me for use in the smaller plants where it is not desired to install larger machines such for example as shown in Letters Patent No. 1,657,619 issued to me under date of January 31, 1928.

The machine of my present invention is very simple and economical in structure, convenient to use and at the same time is highly satisfactory for the purpose. I have not attempted to illustrate certain embodiments and adaptations which I contemplate as it is believed that this disclosure will enable those skilled in the art to embody or adapt my improvements as may be desired.

Having thus described my invention, what I claim as new and desire to secure by Letters Patent is:

1. In a structure of the class described, the combination of a fastener holder having a plurality of transverse fastener receiving slots and a longitudinal bore adapted to receive a fastener locking pin, opposed jaws having longitudinal recesses in their inner sides receiving the opposite sides of said holder, said holder having curved bearing surface at the top and bottom edges thereof in bearing engagement with the top and bottom respectively of said recesses, end plates secured to the ends of said holder and having vertically spaced cammed slots, and pins on the ends of said jaws coacting with said slots.

2. In a structure of the class described, the combination of a fastener holder, opposed jaws having longitudinal recesses in their inner sides receiving the opposite sides of said holder, said holder having curved bearing surface at the top and bottom edges thereof in bearing engagement with the top and bottom respectively of said recesses, end plates secured to the ends of said holder and having vertically spaced slots, and pins on the ends of said jaws coacting with said slots.

3. In a structure of the class described, the combination of a fastener holder, opposed jaws, end plates secured to the ends of said holder and having vertically spaced slots, and pins on the ends of said jaws coacting with said slots.

4. In a structure of the class described, the combination of a fastener holder, opposed jaws, end plates secured to the ends of said holder and having vertically spaced slots, and pins on the ends of said jaws coacting with said slots, said jaws having outwardly projecting vise jaw engaging members at the top thereof.

5. In a structure of the class described, the combination of a fastener holder, opposed jaws having a rocking bearing engagement with the opposite sides of the holder, jaw supports at the ends of said holder, and coacting pins and slots on said supports and jaws.

JAMES K. DIAMOND.